US008560890B2

(12) United States Patent
Belinchón Vergara et al.

(10) Patent No.: US 8,560,890 B2
(45) Date of Patent: Oct. 15, 2013

(54) IMS RECOVERY AFTER HSS FAILURE

(75) Inventors: Maria Carmen Belinchón Vergara, Madrid (ES); Juan Manuel Fernández Galmes, Getafe (ES); Germán Blanco, Paracuellos del Jarama (ES); Santiago Muñoz Muñoz, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 814 days.

(21) Appl. No.: 12/665,469

(22) PCT Filed: Jun. 19, 2007

(86) PCT No.: PCT/EP2007/056069
§ 371 (c)(1),
(2), (4) Date: May 24, 2010

(87) PCT Pub. No.: WO2008/154955
PCT Pub. Date: Dec. 24, 2008

(65) Prior Publication Data
US 2010/0229027 A1  Sep. 9, 2010

(51) Int. Cl.
*G06F 11/00* (2006.01)
*G06F 11/16* (2006.01)

(52) U.S. Cl.
USPC .................... 714/23; 714/20; 714/24; 714/36

(58) Field of Classification Search
USPC .............................. 714/20, 22, 23, 24, 32, 36
See application file for complete search history.

(56) References Cited

U.S. PATENT DOCUMENTS

| 7,369,848 | B2 * | 5/2008 | Jiang ........................... 455/432.3 |
| 2006/0136557 | A1 * | 6/2006 | Schaedler et al. ............. 709/203 |
| 2010/0009678 | A1 * | 1/2010 | Munoz Munoz et al. ...... 455/433 |
| 2010/0293261 | A1 * | 11/2010 | Belinchon Vergara et al. ............................. 709/223 |

FOREIGN PATENT DOCUMENTS

EP        1 775 902        4/2007

OTHER PUBLICATIONS

International Search Report for PCT/EP2007/056069, mailed Mar. 5, 2008.
Written Opinion of the International Searching Authority for PCT/EP2007/056069, mailed Mar. 5, 2008.

(Continued)

*Primary Examiner* — Joseph Schell
(74) *Attorney, Agent, or Firm* — Nixon & Vanderhye P.C.

(57) ABSTRACT

The present invention is aimed to provide means and methods for recovery of an IP Multimedia Subsystem 'IMS' where a Home Subscriber Server 'HSS' holding subscriber data for subscribers of the IMS has suffered a restart. A first method of recovery is applied after detecting a HSS restart, and as receiving a registration from a given subscriber or an invitation to communicate with a given subscriber from another subscriber. A second method of recovery is applied after detecting a HSS restart, and as receiving a request from a given subscriber at a S-CSCF previously assigned for serving the given subscriber in the IMS. Both first and second methods may be applied in the IMS separately, or in cooperation, following a best effort to ensure that, whatever event occurs first, receiving a registration from a given subscriber, or an invitation to communicate with a given subscriber, or receiving a request from a given subscriber at a S-CSCF previously assigned, the actions triggered by the first method or by the second method achieve the recovery of the IMS without further actions not applied yet from said second or first methods.

45 Claims, 9 Drawing Sheets

(56) References Cited

OTHER PUBLICATIONS

"Digital cellular telecommunications system (Phase 2+); Universal Mobile Telecommunications System (UMTS); IP Multimedia (IM) Subsystem Cx and Dx interfaces; Signalling flows and message contents (3GPP TS 29.228 version 6.8.0 Release 6); ETSI TS 129 228", ETSI Standards, (Sep. 2005), 57 pages.

* cited by examiner

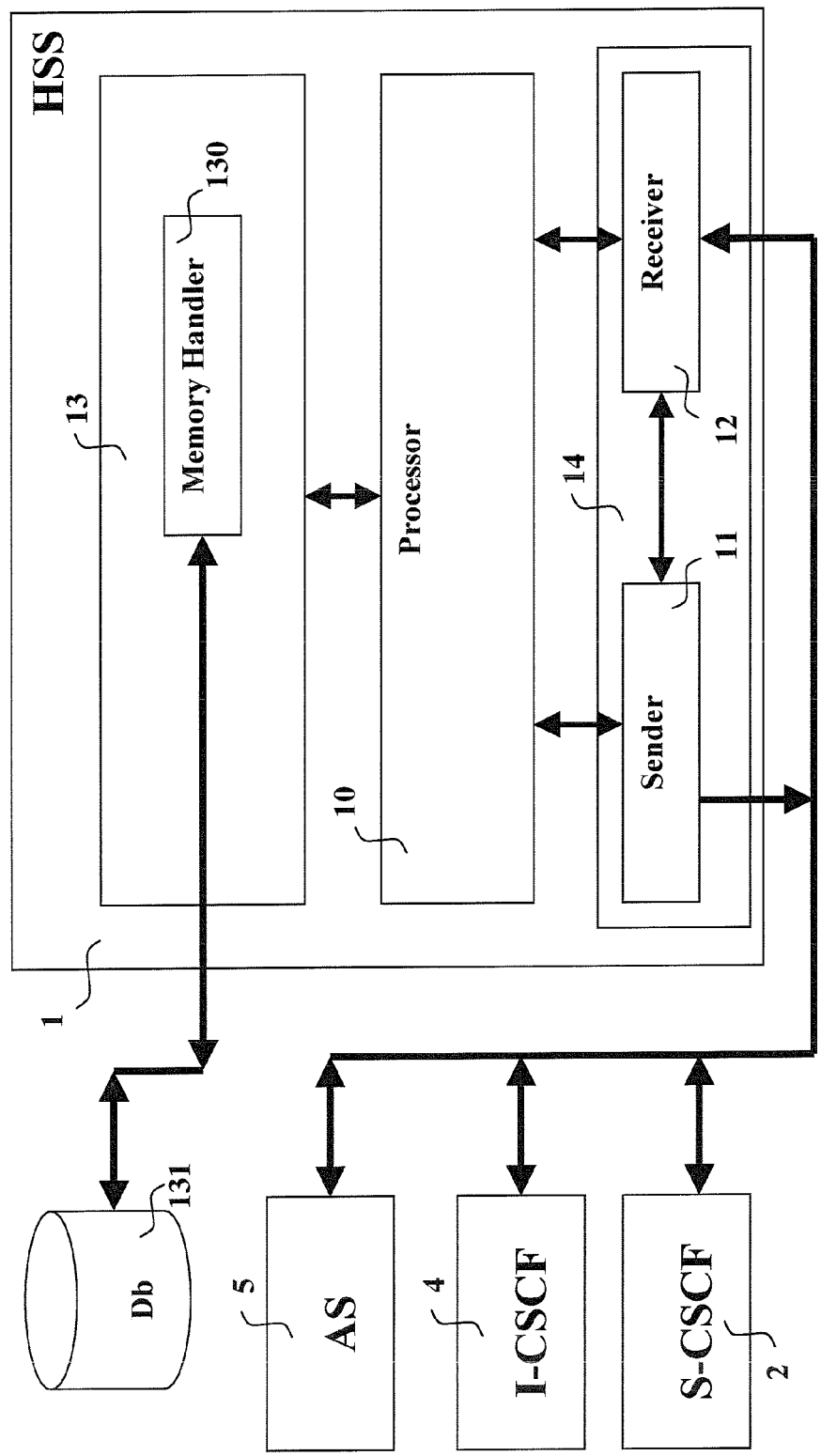
FIG.-7-

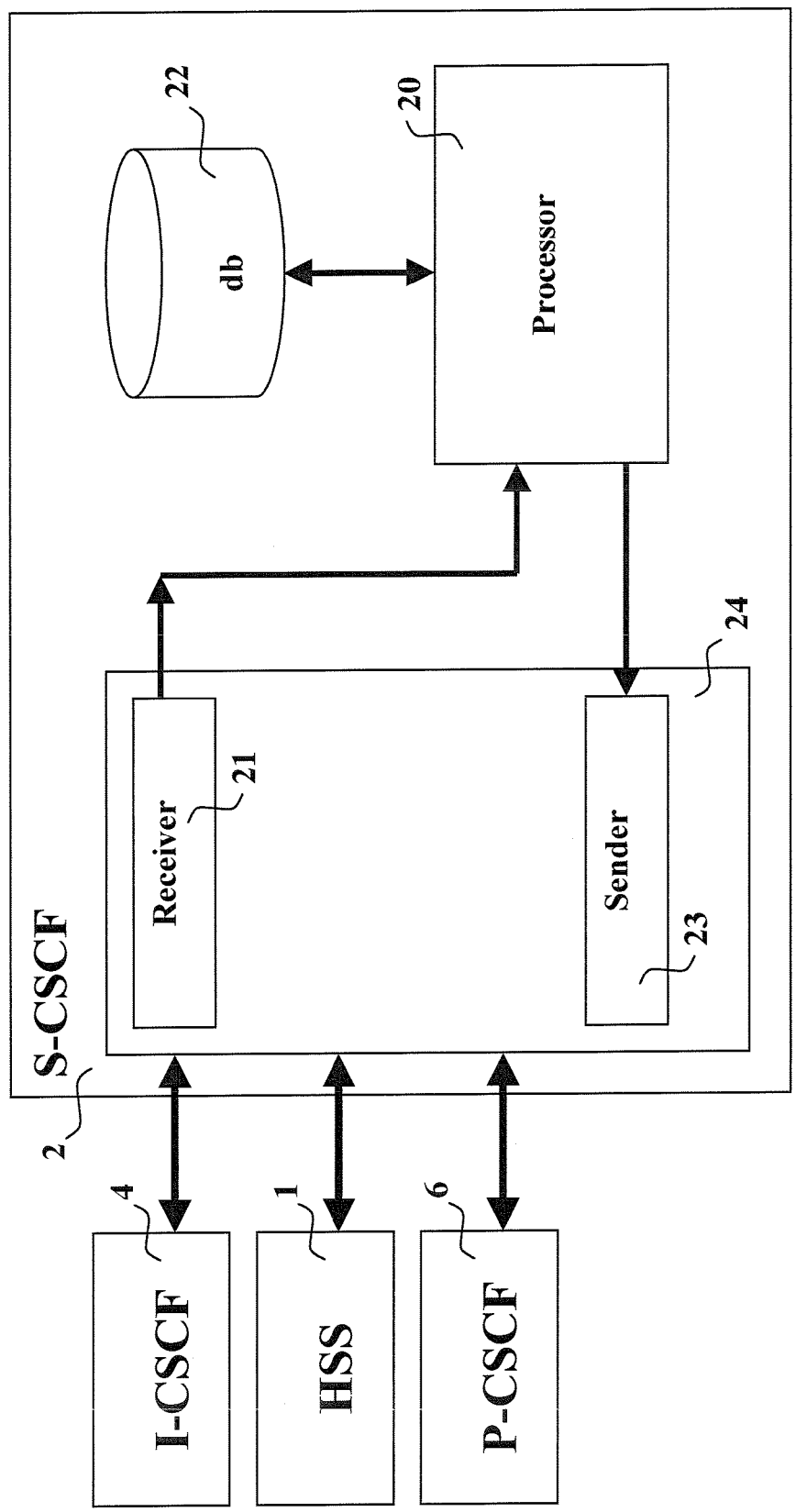
FIG.-8-

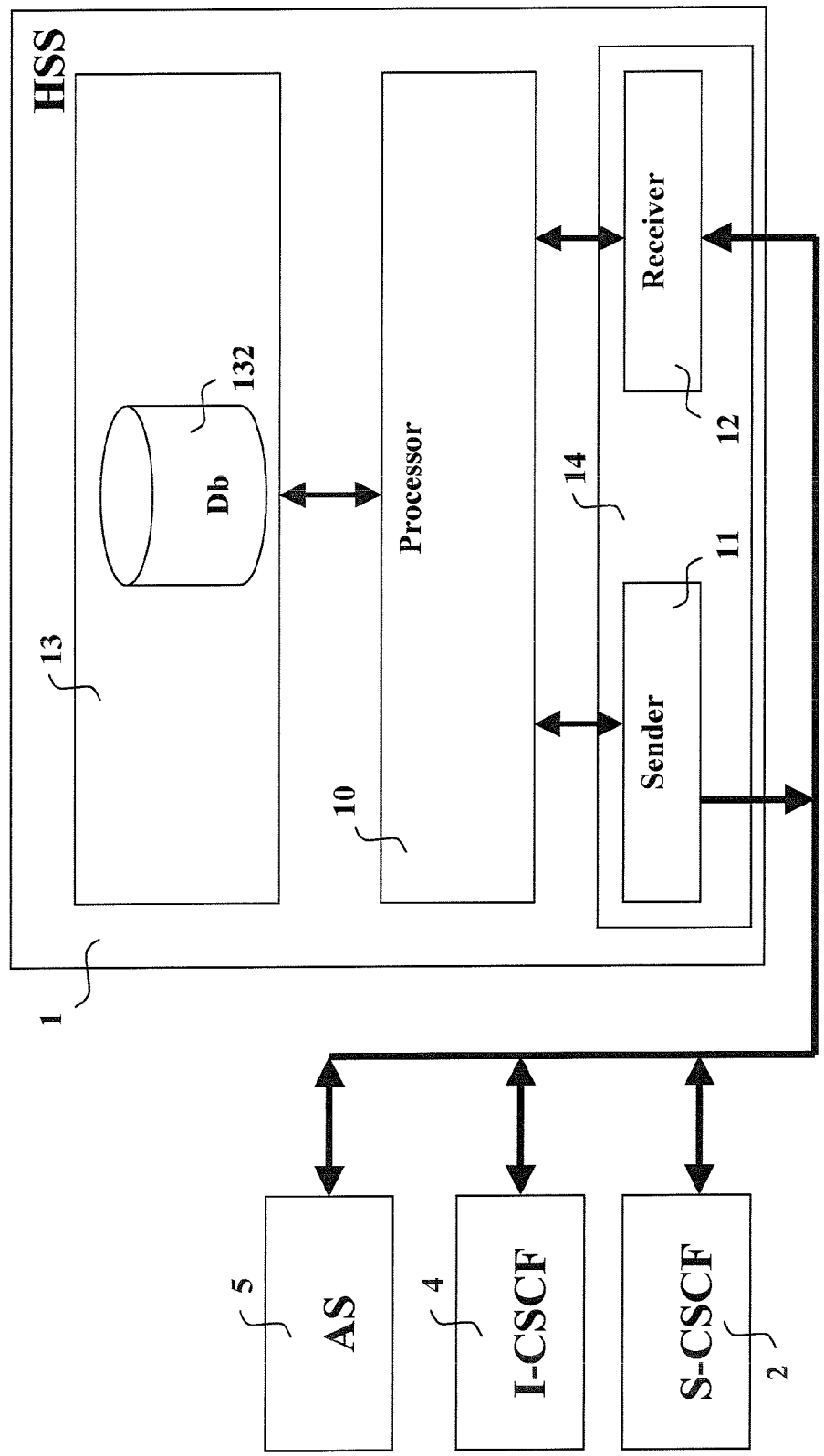
FIG.-9-

IMS RECOVERY AFTER HSS FAILURE

This application is the U.S. national phase of International Application No. PCT/EP2007/056069, filed 19 Jun. 2007, which designated the U.S., the entire contents of which is hereby incorporated by reference.

TECHNICAL FIELD

The present invention generally relates to recovery procedures to apply in an IP Multimedia Subsystem "IMS" where a critical IMS entity has suffered a restart after a failure, reset, or a software or hardware update. In particular, the present invention addresses those recovery procedures to apply where a Home Subscriber Server "HSS" is the critical entity which has suffered the restart.

BACKGROUND

Certain entities of a telecommunication network are found to be critical entities expected to be fault tolerant since a failure in such entities may cause the overall network failure and a huge amount of subscribers of such network not being able to communicate. In particular, where the telecommunication network is an IP Multimedia Subsystem (hereinafter IMS), a Home Subscriber Server (hereinafter HSS) holding subscriber data for subscribers of the IMS is found to be one of said entities whose failure might make the IMS reach abnormal processing conditions so that a huge amount of subscribers cannot properly make use of services or cannot even make calls. In this respect, most or all failures are accompanied by a reset of the failing entity and a sort of restart once the failure has been solved, likely by reloading permanent stable data if inconsistent data were found to be a reason for the failure. Moreover, not only the prevention of a failure in any critical entity is an issue but also other situations causing the critical entity to become out of service, such as a software or hardware update which cannot enter into operation without producing a restart of the critical entity concerned.

Regarding the abnormal processing conditions that an IMS may reach after a HSS restart, an interested reader has to take into account the different sequence of actions that may take place for a given subscriber immediately after the HSS restart, how such actions are said to be treated in accordance with the 3GPP Technical Specification 23.228 v. 8.0.0, and how such actions concern the HSS. For instance, where a Serving Call Session Control Function (hereinafter S-CSCF) had been assigned at a HSS for serving a given subscriber, namely an original S-CSCF, and such HSS suffers a restart, the given subscriber may still be served by said original S-CSCF; however, the HSS might have lost such information or, at least, have doubts on whether the subscriber is still registered in the original S-CSCF. In this situation, a re-registration from the given user, or a new terminating session from another subscriber belonging to another IMS, may lead the own IMS to select a new S-CSCF in the own IMS for serving the given subscriber, whereas previously established sessions through the original S-CSCF would still be served by said original S-CSCF. In this respect, FIG. 1 and FIG. 2 illustrate some abnormal situations that may occur where a first S-CSCF, namely S-CSCF-1 is presently serving a given subscriber and is thus assigned in a HSS, and said HSS suffers a reset to restart again after having solved a fault situation.

As depicted in FIG. 1, after having a restart in the HSS, temporary data such as S-CSCF identifiers may have been lost in the HSS, and subscriber states may be set to 'Not Registered', what means that the S-CSCF-1 assigned to the given user is cleared. In this exemplary situation, the given user tries to register with a new pair of user identities, the so-called IMPI/IMPU pair, which are permanent data under the IMS subscription.

A register message is thus received at an Interrogating Call Session Control Function server (hereinafter I-CSCF) that asks the HSS about a S-CSCF presently serving the given subscriber. In the implementation shown if this exemplary case, any previously assigned S-CSCF, such as the S-CSCF-1 for the given subscriber, has been cleared after the HSS restart. The HSS thus answers the query with capabilities that a selectable new S-CSCF should have for serving the given user. The I-CSCF, taking into account the received capabilities, may select a different S-CSCF to serve the user, which in this exemplary case is S-CSCF-2, where the register message is forwarded. The new selected S-CSCF-2 sends an Authentication Query to the HSS, and the HSS assigns said S-CSCF-2 as presently serving the user by storing a reference to the new S-CSCF-2 for the given user. Then, the HSS downloads authentication information towards the S-CSCF-2. The flow of actions, even though is not drawn in FIG. 1, continues with the currently existing registration procedure.

In the present situation, both HSS and S-CSCF-2 have synchronized data and keep a stable situation. However, the previous S-CSCF-1 assumes to be still the S-CSCF currently serving the user and may be thus acting for sessions previously established and still alive; and this situation may still produce some impacts in further processes since the S-CSCF-1 is keeping out-of-date data for the given user, who is also registered in another server. This may result in a number of subsequent drawbacks derived from having two different S-CSCFs assuming are serving the given user. For example, a Proxy Call Session Control Function server (hereinafter P-CSCF) where the user has accessed the IMS through may have lost any reference to S-CSCF-1, so that still established sessions through the latter cannot be properly released, whereas new originating and terminating sessions will be handled from the S-CSCF-2. Moreover, the problem of having both S-CSCFs simultaneously serving the given user from their own perspective, namely S-CSCF-1 and S-CSCF-2, persists even after a so-called re-registration timer expires in the firstly assigned S-CSCF, S-CSCF-1. Thus, when the timer expires in the S-CSCF-1 and sends an indication of "De-Registration" to HSS, the HSS checks about the S-CSCF which the operation comes from, namely from S-CSCF-1, and since it does not match the presently assigned S-CSCF-2, such de-registration is rejected. In other words, the S-CSCF-1 can not properly de-register the given user. On the other hand, there is no way for the HSS to indicate to the firstly serving S-CSCF-1 that it is not valid anymore since the HSS had cleared all S-CSCF data immediately after, or during, the HSS restart. Also for example, where calls, or sessions, are initiated by an Application Server (hereinafter AS) on behalf of the user, as described in current IMS specifications cited above, the AS may have stored the firstly assigned S-CSCF-1. If the AS had stored the S-CSCF-1 and was subscribed to change notifications, and given that the HSS may have also lost subscription information, HSS can not update the AS with the new assigned server, namely S-CSCF-2, so that the AS continues assuming that the firstly assigned S-CSCF-1 is still serving the user, whilst this S-CSCF-1 does not have the user profile updated, what may lead to an incorrect routing, or even a complete failure, depending on subsequent procedures.

Another exemplary case is depicted in FIG. 2 presenting an abnormal situation that may occur where a first S-CSCF, namely S-CSCF-1, is assigned in a HSS as presently serving a given subscriber, and said HSS suffers a restart. As for the abnormal procedure illustrated in FIG. 1, temporary data may have been lost in the HSS also in this case, such as clearing the previously assigned S-CSCF-1 for a given subscriber and the subscriber state set to 'Not Registered' after having the restart in the HSS. In this exemplary situation, another subscriber tries to establish a terminating session towards the given user, and a corresponding invitation is received in the I-CSCF of the terminating network where the given subscriber belongs to.

Then, the I-CSCF interrogates the HSS asking for a S-CSCF currently serving the given subscriber. Since the HSS had a restart and the previously assigned S-CSCF-1 was cleared, the HSS assumes no S-CSCF is presently assigned for serving the subscriber and returns the capabilities that a selectable S-CSCF should have for the I-CSCF to make an appropriate selection. During the process of selecting a S-CSCF fitting the receiving capabilities, the I-CSCF might select a different S-CSCF for serving the subscriber, such as S-CSCF-2 where the I-CSCF forwards the received invitation to establish the terminating session. The S-CSCF-2 confirms to be presently serving the given subscriber towards the HSS, the HSS locally assigns the S-CSCF-2 as presently serving the given subscriber, and downloads subscriber profile information for the given subscriber towards the S-CSCF-2.

The new S-CSCF-2 presently assigned for serving the given subscriber might particularly apply a so-called "user not registered profile" for the session treatment, so that the session might no reach the terminating subscriber, and may terminate at a voice mailbox server, since the given subscriber is supposedly not registered in the IMS.

As for the previous case illustrated in FIG. 1, also this case illustrated in FIG. 2 has some impacts in further processes since the S-CSCF-1 is still keeping out-of-date data for a user registered in another server, namely in the S-CSCF-2. This situation leaves to handle originating and terminating calls, or sessions, in different S-CSCF entities, namely S-CSCF-1 for the originating sessions and S-CSCF-2 for the terminating ones. Moreover, the incorrect or abnormal handling of calls, or sessions, persists even after a new re-registration arrives from the user since the I-CSCF redirects it to the new S-CSCF-2. The problem of having the information in more than one S-CSCF, in S-CSCF-1 and S-CSCF-2, may persist until a re-registration timer expires in the original S-CSCF-1; and then, similar problems as in the previous abnormal case might occur.

On the other hand, when calls are initiated by an AS on behalf of a user, the AS may have stored the previously assigned S-CSCF-1. Generally speaking, where the AS has stored S-CSCF-1 data and was subscribed to changes, and provided that the HSS might have lost subscriber-related information during the restart, the HSS can not update the AS with the new serving node, the S-CSCF-2, so that the assigned S-CSCF is and will still be the previous one, S-CSCF-1, which does not have an up-to-date user profile, thus leading to an incorrect processing.

Nowadays, such failures in telecommunication networks can be prevented, or are at least minimized by having mated entities which may enter into operation to replace a failing entity or an entity to be upgraded, such as a redundant HSS provides for, whereby once the restart has taken place, the redundant HSS updates the restarted HSS with all updated data and then the operation mode is switched back to make the restarted HSS operative whilst the redundant HSS is switched to a non-operating mode.

However, the HSS redundancy is an optional configuration that not all the operators can afford. Therefore, the present invention is aimed to provide a mechanism for recovery of the IMS where an HSS has suffered a restart after a failure, a software upgrade or other reasons.

SUMMARY

The present invention is aimed to obviate at least some of the above disadvantages and provides means and methods for recovery of the IMS where an HSS holding subscriber data for subscribers of the IMS has suffered a restart, even if the IMS is not configured with a redundant HSS.

In accordance with a first aspect of the present invention there is provided a first method of recovery to be applied in the IMS after having detected a restart condition of a HSS, and as receiving a registration from a given subscriber or an invitation to communicate with a given subscriber from another subscriber.

In accordance with a second aspect of the present invention there is provided a second method of recovery to be applied in the IMS after having detected a restart condition of a HSS, and as receiving a service request from a given subscriber at a S-CSCF previously assigned for serving the given subscriber in the IMS.

Both first and second methods may indistinctly and separately be applied in the IMS, or they both may be applied in cooperation following a best effort implementation to ensure that, whatever event occurs first, either receiving a registration from a given subscriber, or an invitation to communicate with a given subscriber, or receiving a service request from a given subscriber at a S-CSCF previously assigned, either the actions triggered by the first method or those triggered by the second method achieve the recovery of the IMS without needing further actions from the second or first method not applied yet.

Thus, the first method to be applied in the IMS as receiving a registration from a given subscriber, or an invitation to communicate with a given subscriber from another subscriber, comprises the step of: detecting a restart condition in a HSS holding subscriber data for subscribers of the IMS; marking in the HSS all registered subscribers as 'suffering Restart'; receiving at an I-CSCF a registration from a given subscriber or an invitation to communicate with a given subscriber; querying from the I-CSCF towards the HSS about a selectable S-CSCF for serving the given subscriber; determining that the given subscriber is marked in the HSS as 'suffering Restart'; querying relevant entities of the IMS for finding the S-CSCF currently serving the given subscriber; receiving a positive response from the S-CSCF currently serving the given subscriber; assigning said S-CSCF in the HSS for serving the given subscriber; clearing the mark 'suffering Restart' for the given subscriber in the HSS; and selecting said S-CSCF in the I-CSCF for serving the given subscriber.

To this end, and in accordance with a third aspect of the present invention, there is provided a HSS holding subscriber data for subscribers of the IMS and having: a memory module for accessing subscriber data stored for each subscriber of the IMS; a processor arranged for detecting a restart condition in the HSS, for marking in the memory module all registered subscribers as 'suffering Restart', for clearing such mark for a given subscriber, for determining whether a given subscriber is marked in the HSS as 'suffering Restart', and for assigning a S-CSCF for serving a given subscriber in the memory module upon confirmation from said S-CSCF; a receiver arranged for receiving a query about a selectable S-CSCF for serving a given subscriber, and for receiving a confirmation from a S-CSCF currently serving a given subscriber; and a sender arranged for submitting, as a response to the query, an identifier of the S-CSCF currently serving the given subscriber, or capabilities required for selecting a S-CSCF for serving the given subscriber, or an indication that the given subscriber is marked as 'suffering Restart', or combinations thereof. In particular, the memory module of the HSS may include a memory handler for accessing subscriber data stored in an external database for each subscriber of the IMS. Alternatively, the memory module may include an internal database for storing subscriber data for each subscriber of the IMS.

Also to this end, and in accordance with a fourth aspect of the present invention, there is provided a S-CSCF assignable for serving a subscriber registered in the IMS and having: a memory module for storing subscriber data for subscribers currently served in the S-CSCF, the subscriber data received from a Home Subscriber Server "HSS" holding subscriber data for subscribers of the IMS; a receiver arranged for receiving a query on whether the S-CSCF is currently serving a given subscriber; a processor arranged for determining whether a given subscriber is currently served by the S-CSCF; and a sender arranged for answering the query with a positive response where the processor determines that the given subscriber is currently served by the S-CSCF.

In a first embodiment of this first method the step of querying relevant entities of the IMS may be carried out from the HSS towards a S-CSCF still marked as assigned for serving the given subscriber after detecting the restart condition. Alternatively, the step of querying relevant entities of the IMS may carried out from the HSS towards every S-CSCF known to the HSS. To this end, the sender of the HSS may be further arranged for querying relevant entities of the IMS for finding the S-CSCF currently serving the given subscriber. In particular, the query to relevant entities may only be submitted towards a S-CSCF still marked as assigned for serving the given subscriber after detecting the restart condition, or may be submitted towards every S-CSCF known to the HSS. Also to this end, the receiver of the S-CSCF is arranged for receiving the query on whether the S-CSCF is currently serving a given subscriber from the HSS where the given subscriber belongs to.

In a second embodiment of this first method the step of querying relevant entities of the IMS may be carried out from the I-CSCF towards a S-CSCF still marked as assigned for serving the given subscriber in the HSS; and this step includes a step of responding the query about a selectable S-CSCF with a response indicating that the given subscriber is marked as 'suffering Restart' in the HSS and identifying said S-CSCF. Alternatively, the step of querying relevant entities of the IMS may be carried out from the I-CSCF towards every S-CSCF known to the I-CSCF, and this step includes a step of responding the query about a selectable S-CSCF with a response indicating that the given subscriber is marked as 'suffering Restart' in the HSS. To this end, the sender of the HSS may be further arranged for submitting, as a response to the query about a selectable S-CSCF for serving a given subscriber, an identifier of a S-CSCF still marked as assigned for serving the given subscriber after detecting the restart condition. Also to this end, the receiver of the S-CSCF may be arranged for receiving the query about the S-CSCF currently serving a given subscriber from the I-CSCF responsible for routing a registration from the given subscriber or an invitation to communicate with the given subscriber; and the sender of the S-CSCF may be further arranged for submitting a confirmation towards the HSS indicating that the S-CSCF is currently serving the given subscriber.

In particular, the step of receiving the positive response from the S-CSCF currently serving the given subscriber in this first method includes a step of registering the given subscriber towards the HSS from the S-CSCF. To this end, the processor of the HSS may be arranged for clearing the mark 'suffering Restart' for a given subscriber when the receiver of the HSS receives a confirmation from the S-CSCF currently serving the given subscriber.

Where this first method is applied in combination with the second method, one may consider this first method further comprising a step of alerting about the restart condition from the HSS towards relevant entities of the IMS known to the HSS; and a step of marking all subscribers belonging to said HSS in each relevant entity receiving the alert as 'not confirmed in HSS'. Moreover, the step of receiving a positive response from the S-CSCF currently serving the given subscriber in this first method may further include a step of clearing the mark "not confirmed in HSS" in said S-CSCF for the given subscriber. To this end, the sender in cooperation with the processor of the HSS may be further arranged for submitting a reset message alerting about the restart condition detected in the HSS towards relevant entities of the IMS known to the HSS. Also to this end, the receiver of the S-CSCF may be further arranged for receiving the reset message from the HSS alerting about the restart condition detected in the HSS; and the processor of the S-CSCF may be further arranged for marking in the memory module all subscribers belonging to said HSS as 'not confirmed in HSS', and for determining whether a given subscriber is marked as 'not confirmed in HSS' upon a query from any other IMS entity. Moreover, the processor of the S-CSCF may be arranged for clearing the mark 'not confirmed in HSS' for the given subscriber when the sender of the S-CSCF answers the query with a positive response.

On the other hand, the second method to be applied in the IMS as receiving a service request from a given subscriber at a S-CSCF previously assigned for serving the given subscriber, comprises the steps of: detecting a restart condition in a HSS holding subscriber data for subscribers of the IMS; alerting from the HSS towards relevant IMS entities about the HSS restart; marking all subscribers belonging to said HSS in each relevant IMS entity receiving the alert as 'not confirmed in HSS'; receiving a message related to a given subscriber at a S-CSCF previously assigned for serving the given subscriber registered in the IMS; determining that the given subscriber is marked in the S-CSCF as 'not confirmed in HSS'; registering from the S-CSCF the given subscriber towards the HSS; re-assigning said S-CSCF, from which the given subscriber is registered, at the HSS as presently serving said given subscriber; and clearing the mark "not confirmed in HSS" in said S-CSCF for the given subscriber.

To this end, and in accordance with a fifth aspect of the present invention, there is provided a HSS holding subscriber data for subscribers of the IMS and having: a memory module for accessing subscriber data stored for each subscriber of the IMS; a receiver arranged for receiving a registration from a S-CSCF presently serving a given subscriber registered in the IMS; a processor arranged for detecting a restart condition in the HSS, for determining relevant IMS entities to be alerted about the restart condition in HSS, and for assigning the S-CSCF in the memory module as presently serving the given subscriber when the receiver receives the registration from the S-CSCF; and a sender arranged for submitting a reset message alerting about the restart condition detected in the HSS towards relevant IMS entities known to the HSS. In particular, the memory module of the HSS may include a memory handler for accessing subscriber data stored in an external database for each subscriber of the IMS. Alternatively, the memory module may include an internal database for storing subscriber data for each subscriber of the IMS.

Also to this end, and in accordance with a sixth aspect of the present invention, there is provided a S-CSCF assignable for serving a subscriber registered in the IMS and having: a memory module for storing subscriber data for subscribers currently served in the S-CSCF, the subscriber data received from a HSS holding subscriber data for subscribers of the IMS; a receiver arranged for receiving a reset message from a HSS alerting about a restart condition detected in the HSS, and for receiving a message related to a given subscriber previously served by the S-CSCF; a processor arranged for marking in the memory module all subscribers belonging to said HSS as 'not confirmed in HSS', for clearing such mark for a given subscriber, and for determining whether a given subscriber is marked as 'not confirmed in HSS'; and a sender arranged for registering the given subscriber towards the HSS where the processor determines that the given subscriber is marked as 'not confirmed in HSS'.

In a first embodiment of this second method the step of receiving a message related to a given subscriber includes a step of originating the message from an originating subscriber addressing the given subscriber; and a step of submitting the service request from another S-CSCF serving the originating subscriber. To this end, the receiver of the S-CSCF is arranged for receiving the message related to the given subscriber, previously served by the S-CSCF and marked as 'not confirmed in HSS', from a second S-CSCF serving an originating subscriber other than the given subscriber.

In a second embodiment of this second method the step of receiving a message related to a given subscriber includes a step of submitting the request from a P-CSCF where the given subscriber accesses the IMS through. To this end, the receiver of the S-CSCF is arranged for receiving the message related to the given subscriber, previously served by the S-CSCF and marked as 'not confirmed in HSS', from a P-CSCF where the given subscriber accesses the IMS through.

Where this second method is applied in combination with the above first method, one may consider this second method further comprising a step of marking in the HSS all registered subscribers as 'suffering Restart', this step being carried out following the step of detecting the restart condition in the HSS. Additionally in this second method, the step of registering from the S-CSCF the given subscriber towards the HSS may include a step of clearing the mark 'suffering Restart' in the HSS for the given subscriber. Moreover, where this second method is applied in combination with the above first method, one may consider this second method further comprising the steps of querying relevant entities of the IMS for finding the S-CSCF currently serving the given subscriber; receiving a positive response from the S-CSCF currently serving the given subscriber; assigning said S-CSCF in the HSS for serving the given subscriber; clearing the mark 'suffering Restart' for the given subscriber in the HSS; and selecting said S-CSCF in the I-CSCF for serving the given subscriber.

To this end, the processor of the HSS may be further arranged for marking all registered subscribers in the memory module as 'suffering Restart', as detecting the restart condition in the HSS; and for clearing the mark 'suffering Restart' for a given subscriber when the receiver of the HSS receives the registration from the S-CSCF presently serving the given subscriber.

In an embodiment of the invention, where first and second methods are applied in cooperation, the receiver of the HSS may be further arranged for receiving a query from an I-CSCF asking for the S-CSCF presently assigned for serving the given subscriber; the processor of the HSS may be further arranged for determining a corresponding query from the HSS towards relevant IMS entities; and the sender of the HSS may be further arranged for broadcasting the query towards every relevant IMS entity known to the HSS. Moreover, the receiver of the HSS may be further arranged for receiving a positive response from the S-CSCF presently assigned for serving the given subscriber; the processor of the HSS may be further arranged for assigning the S-CSCF as presently serving said given subscriber; and the sender of the HSS may be further arranged for submitting a response towards the I-CSCF indicating the S-CSCF presently serving said given subscriber.

In another embodiment of the invention, where first and second methods are applied in cooperation, the receiver of the HSS may be further arranged for receiving a query from an I-CSCF asking for the S-CSCF presently assigned for serving the given subscriber; the processor of the HSS may be further arranged for determining a further query from the I-CSCF towards relevant IMS entities; and the sender of the HSS may be further arranged for returning an indication of broadcasting the query towards every S-CSCF known to the I-CSCF.

Also to this end, where first and second methods are applied in cooperation, and in accordance with an embodiment of the invention, the receiver of the S-CSCF may be further arranged for receiving a query from an I-CSCF asking for the S-CSCF presently assigned for serving a given subscriber; the processor of the S-CSCF may be further arranged for determining that the given subscriber is marked 'not confirmed in HSS'; and the sender of the S-CSCF may be further arranged for submitting a response indicating the S-CSCF is presently assigned for serving the given subscriber. Moreover, the sender of the S-CSCF may be further arranged for submitting a confirmation towards the HSS indicating that the S-CSCF is presently assigned for serving the given subscriber, and the processor of the S-CSCF may be further arranged for clearing the mark 'not confirmed in HSS' for the given subscriber. Additionally in this embodiment, the processor of the S-CSCF is further arranged for determining that the given subscriber is not marked as 'not confirmed in HSS'; and the sender of the S-CSCF is further arranged for ignoring the query, or for submitting a negative response.

Also to this end, where first and second methods are applied in cooperation, and in accordance with another embodiment of the invention, the receiver of the S-CSCF may be further arranged for receiving a query from the HSS asking for the S-CSCF presently assigned for serving a given subscriber; the processor of the S-CSCF may be further arranged for determining that the given subscriber is marked as 'not confirmed in HSS', and for clearing such mark for the given subscriber; and the sender of the S-CSCF may be further arranged for submitting a response towards the HSS indicating that the S-CSCF is presently assigned for serving the given subscriber. Additionally in this embodiment, the processor of the S-CSCF is further arranged for determining that the given subscriber is not marked as 'not confirmed in HSS'; and the sender of the S-CSCF is further arranged for ignoring the query, or for submitting a negative response.

The invention may be practised by a computer program, which is loadable into an internal memory of a computer with input and output units as well as with a processing unit, the computer program comprises executable software, which may be separable in different portions, adapted to carry out the above method steps in the above different entities, server or devices, when running in a number of computers. In particular, the executable software, or portions thereof, may be recorded in a carrier readable medium.

BRIEF DESCRIPTION OF THE DRAWINGS

The features, objects and advantages of the invention will become apparent by reading this description in conjunction with the accompanying drawings, in which:

FIG. 7 is a basic block diagram illustrating the structural elements that a HSS may comprise in accordance with an embodiment of the invention.

FIG. 8 is a basic block diagram illustrating the structural elements that a S-CSCF may comprise in accordance with an embodiment of the invention.

FIG. 9 is a basic block diagram illustrating the structural elements that a HSS may comprise in accordance with another embodiment of the invention.

DETAILED DESCRIPTION

The following describes some preferred embodiments for methods of recovery to be applied in the IMS after having detected a restart condition in a HSS 1. A first method to be preferably applied as receiving a registration from a given subscriber or an invitation to communicate with a given subscriber from another subscriber, and a second method to be preferably applied as receiving a service request from a given subscriber at a S-CSCF 2 previously assigned for serving the given subscriber in the IMS. In addition, the following also describes preferred embodiments of a HSS 1 and a S-CSCF 2 respectively adapted for carrying out the above first or second methods. Moreover, since said first and second methods can be simultaneously combined to achieve the expected result as soon as possible, and depending on which of the following actions occurs first: the registration from a given subscriber, or the invitation to communicate with a given subscriber from another subscriber, or the reception of the service request from a given subscriber at the S-CSCF previously assigned, the HSS 1 and the S-CSCF 2 may be thus arranged to include all structural elements for carrying out both first and second methods.

Figure 4:
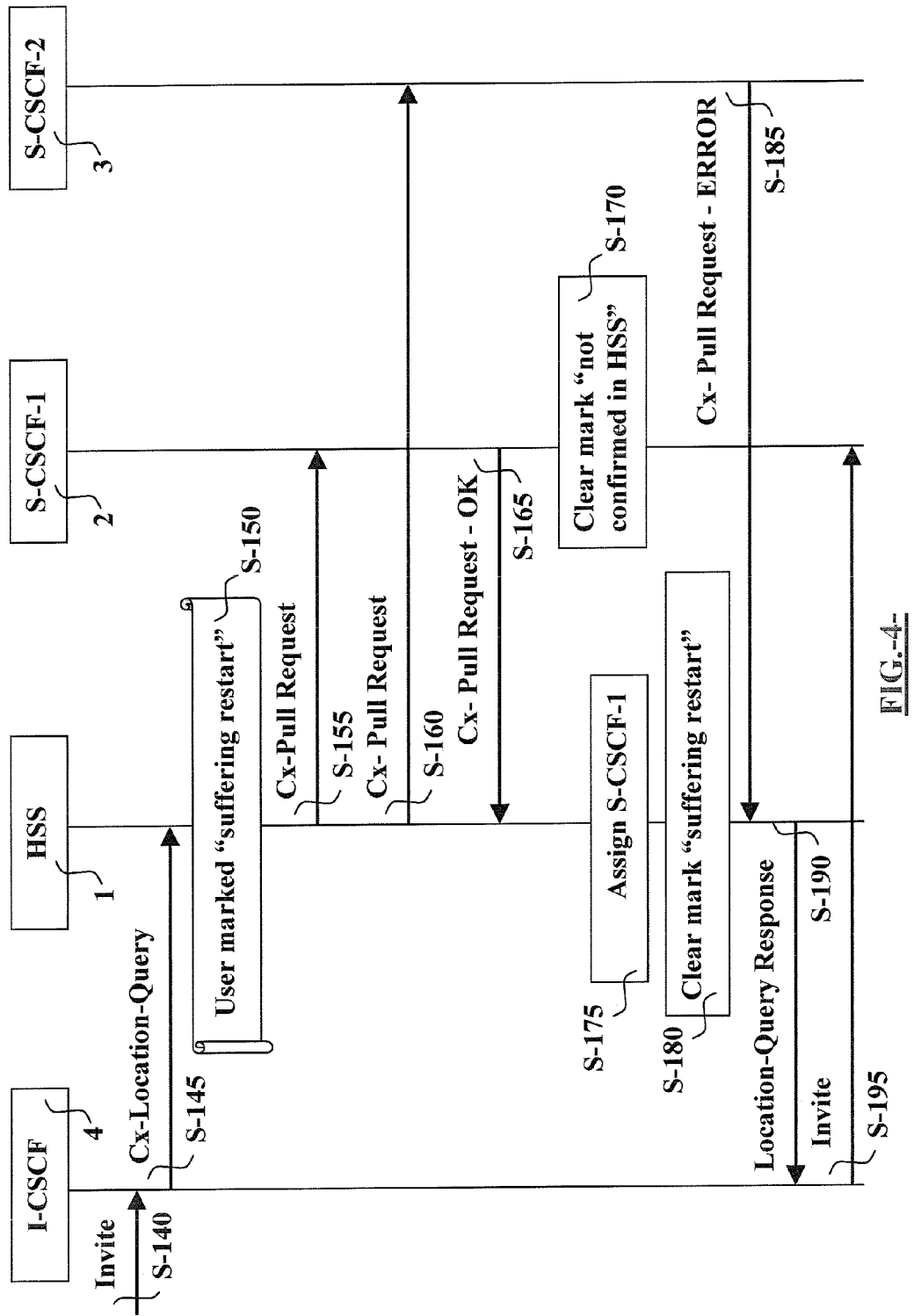
FIG. 4 is a sequence diagram illustrating a first embodiment of a first method of recovery to be applied in an IMS after having detected a restart condition in a HSS holding subscriber data for subscribers of the IMS.
Figure 6:
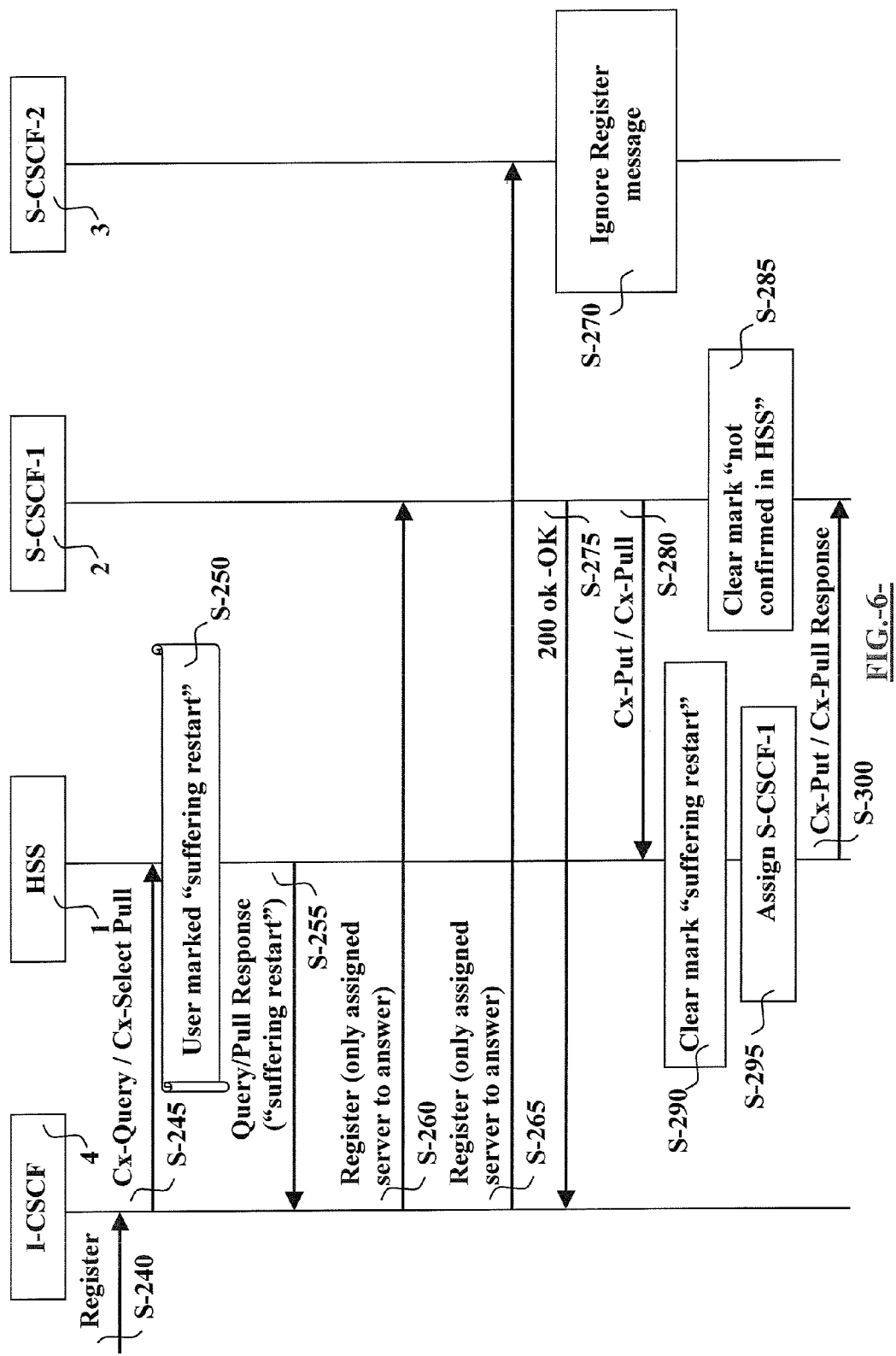
FIG. 6 is a sequence diagram illustrating a second embodiment of the first method of recovery to be applied in an IMS after having detected a restart condition in a HSS holding subscriber data for subscribers of the IMS.

In accordance with a first aspect of the present invention, FIG. 4 and FIG. 6 illustrate respective first and second embodiments of the first method of recovery to be applied in the IMS after having detected a restart condition in a HSS 1 holding subscriber data for subscribers of the IMS, and as receiving a registration from a given subscriber or an invitation to communicate with a given subscriber from another subscriber. In particular, FIG. 4 illustrates a first embodiment of this method exemplary applied as receiving an invitation to communicate with a given subscriber from another subscriber, though this first embodiment may also be applied as receiving a registration from a given subscriber. Also in particular, FIG. 6 illustrates a second embodiment of this method exemplary applied as receiving a registration from a given subscriber, though this second embodiment may also be applied as receiving an invitation to communicate with a given subscriber from another subscriber.

Figure 1:
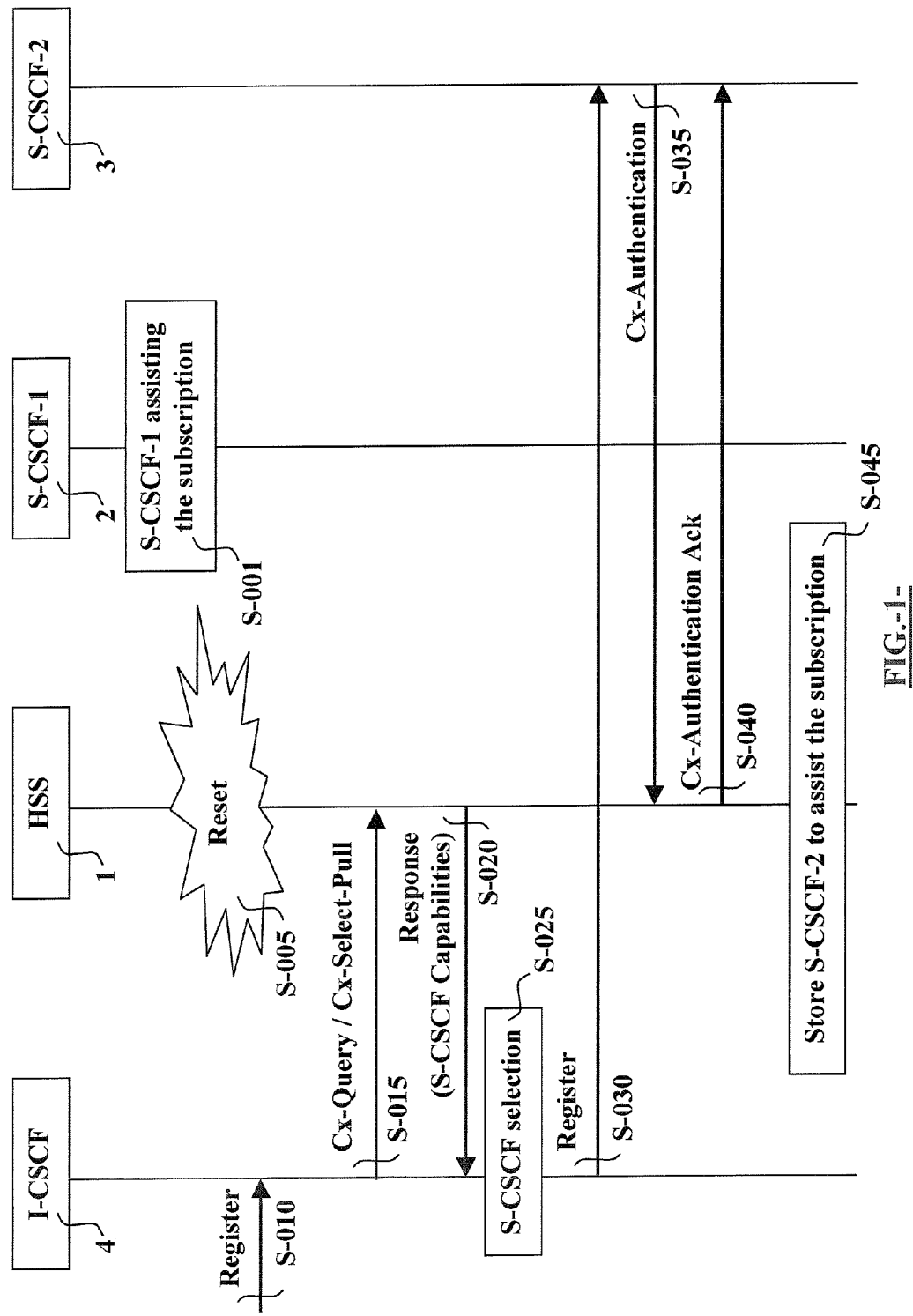
FIG. 1 illustrates a sequence diagram of a first exemplary abnormal procedure occurring after suffering a restart in a HSS holding subscriber data for subscribers of an IMS.
Figure 2:
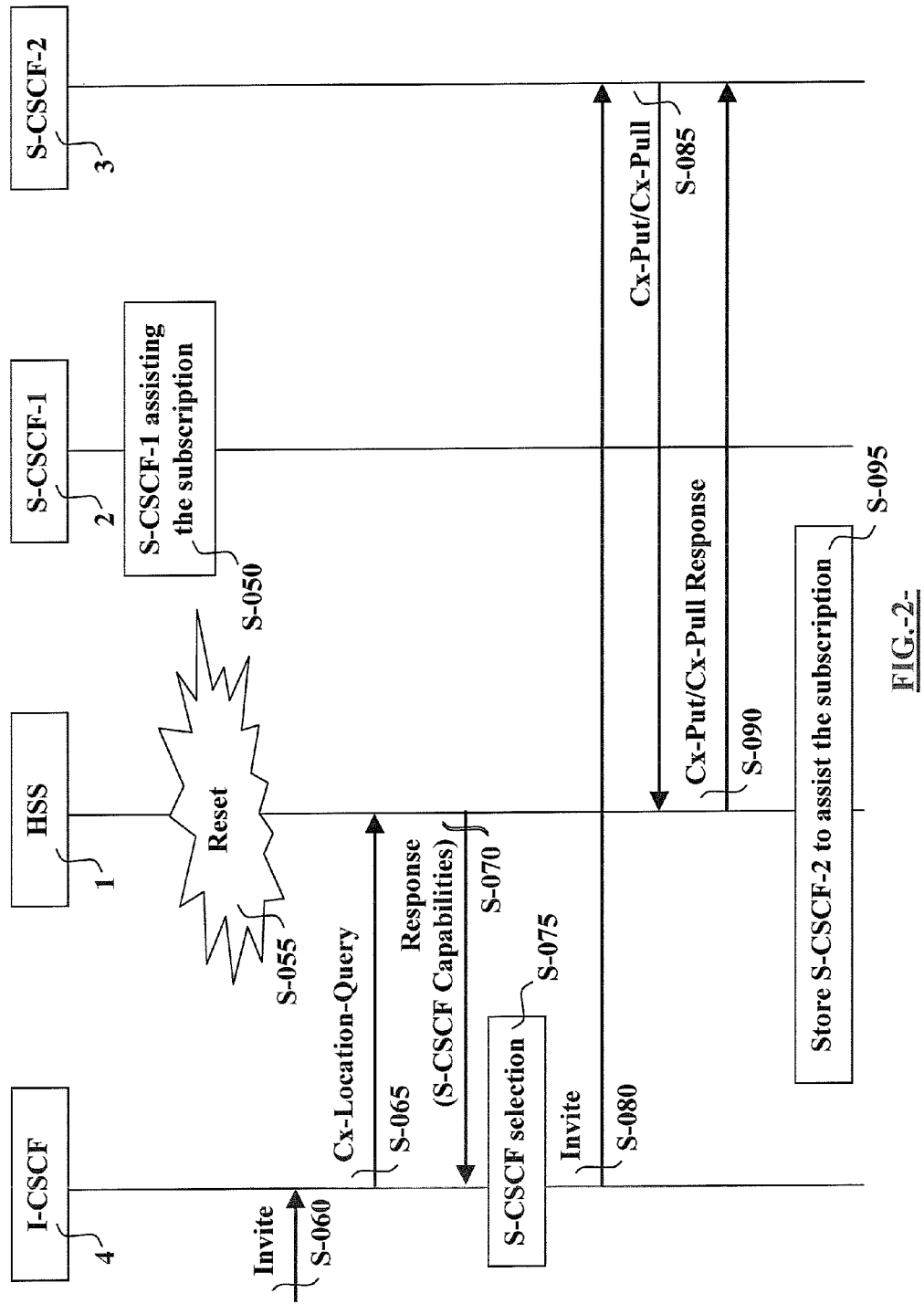
FIG. 2 illustrates a sequence diagram of a second exemplary abnormal procedure occurring after suffering a restart in a HSS holding subscriber data for subscribers of an IMS.

This first method assumes that a first S-CSCF 2, hereinafter S-CSCF-1, had previously been assigned in steps S-001 or S-050, respectively shown in FIG. 1 in FIG. 2, for serving a given subscriber; and the method starts with preliminary first and second steps not shown in FIG. 4 and FIG. 6 for the sake of simplicity, namely with a first step of detecting a restart condition in the HSS 1, as illustrated by steps S-005 in FIG. 1 and S-055 in FIG. 2, and with a second step of marking in the HSS 1 all registered subscribers as 'suffering a Restart', as illustrated by step S-120 in FIG. 3.

To this end, as illustrated in FIG. 7 and FIG. 9, the HSS 1 includes a memory module 13 for accessing subscriber data stored for each subscriber of the IMS and a processor 10 arranged for detecting a restart condition in the HSS and for marking in the memory module all registered subscribers as 'suffering Restart'. In particular, as already commented above and as illustrated in FIG. 7, the memory module 13 of the HSS 1 may include a memory handler 130 for accessing subscriber data stored in an external database 131 for each subscriber of the IMS. Alternatively and as illustrated in FIG. 9, the memory module 13 may include an internal database 132 for storing subscriber data for each subscriber of the IMS. Also to this end, as illustrated in FIG. 8, the S-CSCF 2 previously assigned for serving the given subscriber includes a memory module 22 for storing subscriber data for subscribers currently served in the S-CSCF. The subscriber data received from the HSS 1 when previously assigning said S-CSCF for serving the given subscriber.

Under the first embodiment illustrated in FIG. 4, an invitation to communicate with a given subscriber is received during a step S-140 at an I-CSCF 4 in accordance with currently existing IMS procedures, and the I-CSCF 4 queries the HSS during a step S-145 about a selectable S-CSCF for serving the given subscriber. To this end, as illustrated in FIG. 7 and FIG. 9, the HSS 1 includes a receiver 12 arranged for receiving a query about a selectable S-CSCF for serving a given subscriber.

The HSS 1 receiving such query determines during a step S-150 that the given subscriber is still marked as 'suffering Restart' and assumes that this is the first action for the given subscriber where the recovery can be attempted. To this end, as illustrated in FIG. 7 and FIG. 9, the processor 10 of the HSS 1 is arranged for determining whether a given subscriber is marked in the HSS as 'suffering Restart'.

Under this embodiment, the HSS 1 triggers a query towards relevant IMS entities 2, 3, 5 for finding the S-CSCF currently serving the given subscriber. In those implementations where the previously assigned S-CSCF-1 is not lost but is not trusted, the HSS may only query during a step S-155 the S-CSCF-1 still marked as assigned for serving the given subscriber after detecting the restart condition. However, in implementations where the previously assigned S-CSCF-1 is lost, the HSS queries every S-CSCF 2, 3 known to the HSS during exemplary steps S-155 and S-160. In a nowadays preferred embodiment, only the previously assigned S-CSCF-1 returns a positive response during a step S-165 indicating to be currently serving the given subscriber. In other embodiments, all the other IMS entities 3, 5, rather than ignoring the query, return a negative response during a step S-185 to indicate they are not serving the given subscriber. To this end, as illustrated in FIG. 7 and FIG. 9, the sender 11 of the HSS may be further arranged for querying relevant entities of the IMS for finding the S-CSCF currently serving the given subscriber. In particular, this sender may be arranged to only submit this query towards a S-CSCF still marked as assigned for serving the given subscriber after detecting the restart condition. Alternatively, the sender may be arranged to submit the query towards every S-CSCF known to the HSS. Also to this end, as illustrated in FIG. 8, the S-CSCF 2 includes a receiver 21 arranged for receiving a query on whether the S-CSCF is currently serving a given subscriber; a processor 20 arranged for determining whether a given subscriber is currently served by the S-CSCF; and a sender 23 arranged for answering the query with a positive response where the processor 20 determines that the given subscriber is currently served by the S-CSCF. In particular, the receiver 21 of the S-CSCF may be arranged for receiving the query on whether the S-CSCF is currently serving a given subscriber from the HSS where the given subscriber belongs to.

The HSS 1 receiving the positive response from the S-CSCF-1 currently serving the given subscriber, assigns such S-CSCF-1 as presently serving the given subscriber during a step S-175, and clears the mark 'suffering Restart' for the given subscriber during a step S-180. To this end, as illustrated in FIG. 7 and FIG. 9, the receiver 12 of the HSS 1 is arranged for receiving a confirmation from the S-CSCF currently serving a given subscriber, and the processor 10 of the HSS 1 is arranged for clearing the mark 'suffering Restart' for a given subscriber and for assigning a S-CSCF 2 for serving a given subscriber in the memory module 13 upon confirmation from said S-CSCF.

Then, the HSS 1 responds the original query from the I-CSCF 4 with the presently assigned S-CSCF-1 for serving the given subscriber during a step S-190, and the I-CSCF 4 selects such S-CSCF-1 for serving the given subscriber and forwards the invitation to communicate with the given subscriber during a step S-195. Then, traditional IMS procedures may go on for the given subscriber. In cases where no positive response is received in the HSS, no assignable S-CSCF is known to the HSS and the original query from the I-CSCF is answered with capabilities required for selecting a new S-CSCF in accordance with conventional procedures. To this end, as illustrated in FIG. 7 and FIG. 9, the HSS 1 includes a sender 11 arranged for submitting, as a response to the query, an identifier of the S-CSCF 2 currently serving the given subscriber, or capabilities required for selecting a S-CSCF.

Under the second embodiment illustrated in FIG. 6, a registration from a given subscriber is received during a step S-240 at an I-CSCF 4 in accordance with currently existing IMS procedures, and the I-CSCF 4 queries the HSS 1 during a step S-245 about a selectable S-CSCF 2 for serving the given subscriber. As for the first embodiment, and as illustrated in FIG. 7 and FIG. 9, the HSS 1 includes a receiver 12 arranged for receiving a query about a selectable S-CSCF for serving a given subscriber.

As for the first embodiment, the HSS 1 receiving such query determines during a step S-250 that the given subscriber is still marked as 'suffering Restart' and assumes that this is the first action for the given subscriber where the recovery can be attempted. To this end, as illustrated in FIG. 7 and FIG. 9, the processor 10 of the HSS 1 is arranged for determining whether a given subscriber is marked in the HSS as 'suffering Restart'.

Under this second embodiment, however, the HSS 1 responds the query from the I-CSCF 4 with an indication of 'suffering Restart' during a step S-255 towards the I-CSCF 4, implicitly indicating that the previously assigned S-CSCF-1 for serving the given subscriber is lost or not trustable. To this end, as illustrated in FIG. 7 and FIG. 9, the HSS 1 includes a sender 11 arranged for submitting, as a response to the query, an indication that the given subscriber is marked as 'suffering Restart' along with an identifier of the S-CSCF currently serving the given subscriber, or with capabilities required for selecting a S-CSCF for serving the given subscriber.

Then, under this second embodiment illustrated in FIG. 6 for the first method, the I-CSCF 4 triggers a query towards relevant IMS entities 2, 3, 5 for finding the S-CSCF currently serving the given subscriber. In those implementations where the previously assigned S-CSCF-1 is not lost in the HSS 1 but is not trusted, the HSS may return an identifier of the S-CSCF-1 along with the indication of 'suffering Restart', so that the I-CSCF 4 may only query during a step S-260 the S-CSCF-1 still marked as assigned for serving the given subscriber and found to be not trustable. However, in implementations where the previously assigned S-CSCF-1 is lost in the HSS and is thus not included in the response along with the indication of 'suffering Restart', the I-CSCF 4 queries every S-CSCF 2, 3 known to the I-CSCF during exemplary steps S-260 and S-265. In a nowadays preferred embodiment, only the previously assigned S-CSCF-1 returns a positive response during a step S-275 indicating to be currently serving the given subscriber, whereas other S-CSCF 3 simply ignore the query in step S-270. In other embodiments as the above first embodiment, other IMS entities 3, 5, rather than ignoring the query, may return a negative response to indicate they are not serving the given subscriber. To this end, as illustrated in FIG. 8, the S-CSCF 2 includes a receiver 21 arranged for receiving a query on whether the S-CSCF is currently serving a given subscriber; a processor 20 arranged for determining whether a given subscriber is currently served by the S-CSCF; and a sender 23 arranged for answering the query with a positive response where the processor 20 determines that the given subscriber is currently served by the S-CSCF. In particular, the receiver 21 of the S-CSCF may be arranged for receiving the query on whether the S-CSCF is currently serving a given subscriber from the I-CSCF 4 responsible for routing a registration from the given subscriber or an invitation to communicate with the given subscriber.

In embodiments where the I-CSCF 4 is the entity triggering the query towards relevant IMS entities 2, 3, 5 for finding the S-CSCF currently serving the given subscriber, this first method may include a step S-280 of registering the given subscriber towards the HSS 1 from the S-CSCF-1. Alternatively and not shown in any drawing, the I-CSCF 4 may confirm the selection of S-CSCF-1 for currently serving the given subscriber. To this end, as illustrated in FIG. 8, the sender 23 of the S-CSCF 2 is further arranged for submitting a confirmation towards the HSS 1 indicating that the S-CSCF is currently serving the given subscriber.

The HSS 1 receiving the registration, namely a confirmation, from the S-CSCF-1 during a step S-280, or from the I-CSCF 4, clears the mark 'suffering Restart' for the given subscriber during a step S-290, and assigns such S-CSCF-1 as presently serving the given subscriber during a step S-295. To this end, as illustrated in FIG. 7 and FIG. 9, the receiver 12 of the HSS 1 is arranged for receiving a confirmation from the S-CSCF 2 currently serving a given subscriber, or from an I-CSCF 4, and the processor 10 of the HSS 1 is arranged for clearing the mark 'suffering Restart' for a given subscriber and for assigning a S-CSCF 2 for serving a given subscriber in the memory module 13 upon confirmation from said S-CSCF.

Figure 3:
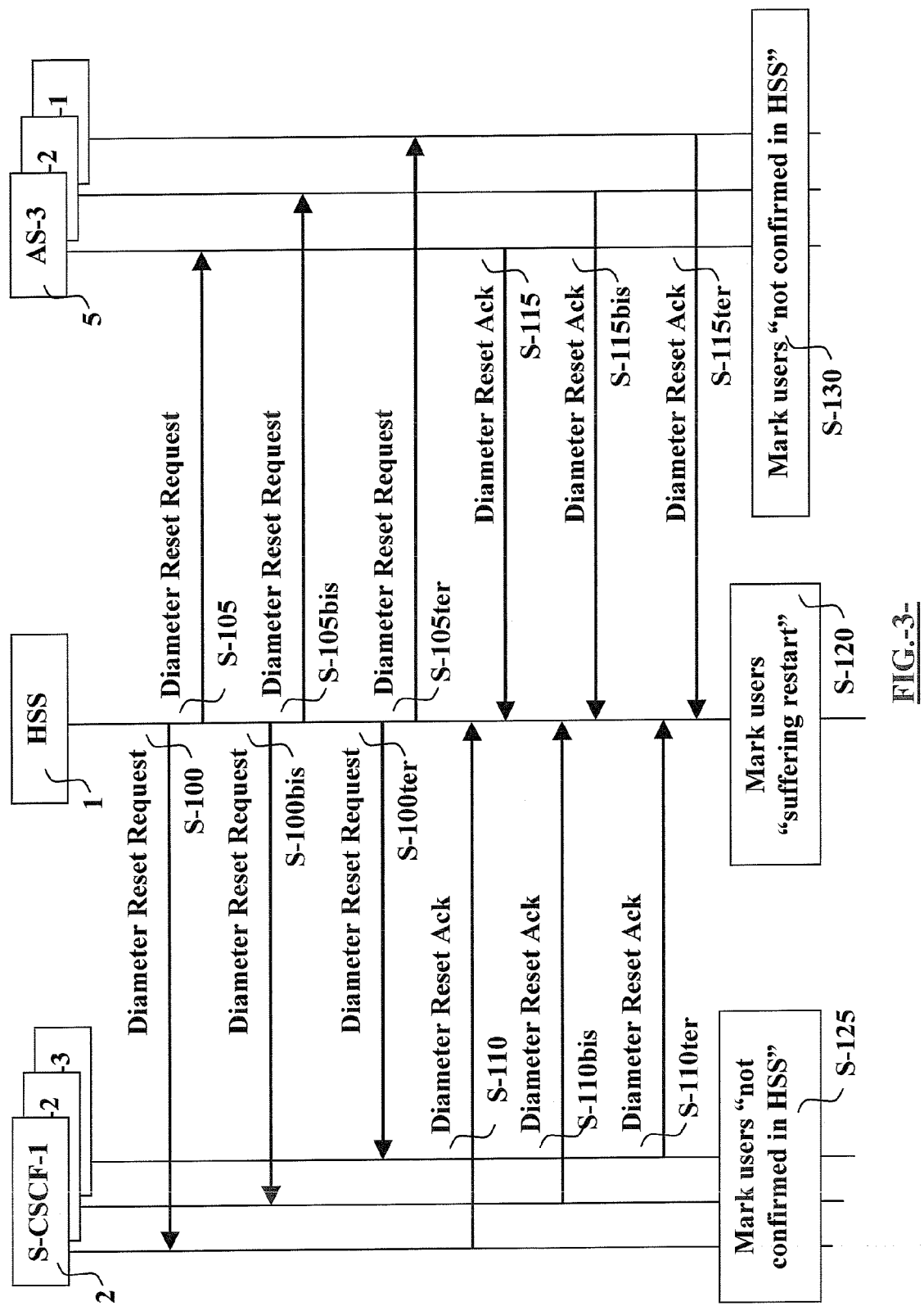
FIG. 3 illustrates a number of steps to be selectively carried out for a first and a second method of recovery to be applied in an IMS after having detected a restart condition in a HSS holding subscriber data for subscribers of the IMS.

Then, the HSS 1 acknowledges the S-CSCF-1 being assigned for serving the given subscriber during a step S-300, and traditional IMS procedures may go on for the given subscriber.

Where the above first method is applied in combination with the second method detailed in the following, this first method may comprise steps S-100, S-105, S-100bis, S-105bis, S-100ter, S-105ter of alerting about the restart condition from the HSS 1 towards relevant entities of the IMS 2, 3, 5 known to the HSS; and steps S-125, S-130 of marking all subscribers belonging to said HSS 1 in each relevant entity receiving the alert as 'not confirmed in HSS', as illustrated in FIG. 3. In this case, the first and second embodiments of this first method, as respectively illustrated in FIG. 4 and FIG. 6, include respective steps S-170 and S-285 of clearing the mark "not confirmed in HSS" in the S-CSCF 2 submitting the confirmation of being currently serving the given subscriber in steps S-165 and S-280.

To this end, as illustrated in FIG. 7 and FIG. 9, the sender 11 in cooperation with the processor 10 of the HSS 1 may be arranged for submitting a reset message to alert about the restart condition detected in the HSS towards relevant entities 2, 3, 5 of the IMS known to the HSS. Also to this end, as illustrated in FIG. 8, the receiver 21 of the S-CSCF 2 may be arranged for receiving the reset message from the HSS 1 alerting about the restart condition detected in the HSS; and the processor 20 of the S-CSCF 2 may be further arranged for marking in the memory module 22 all subscribers belonging to said HSS as 'not confirmed in HSS', and for determining whether a given subscriber is marked as 'not confirmed in HSS' upon a query from any other IMS entity 3. Moreover, the processor 20 of the S-CSCF may be arranged for clearing the mark 'not confirmed in HSS' for the given subscriber when the sender 23 of the S-CSCF 2 answers the query with a positive response.

Figure 5:
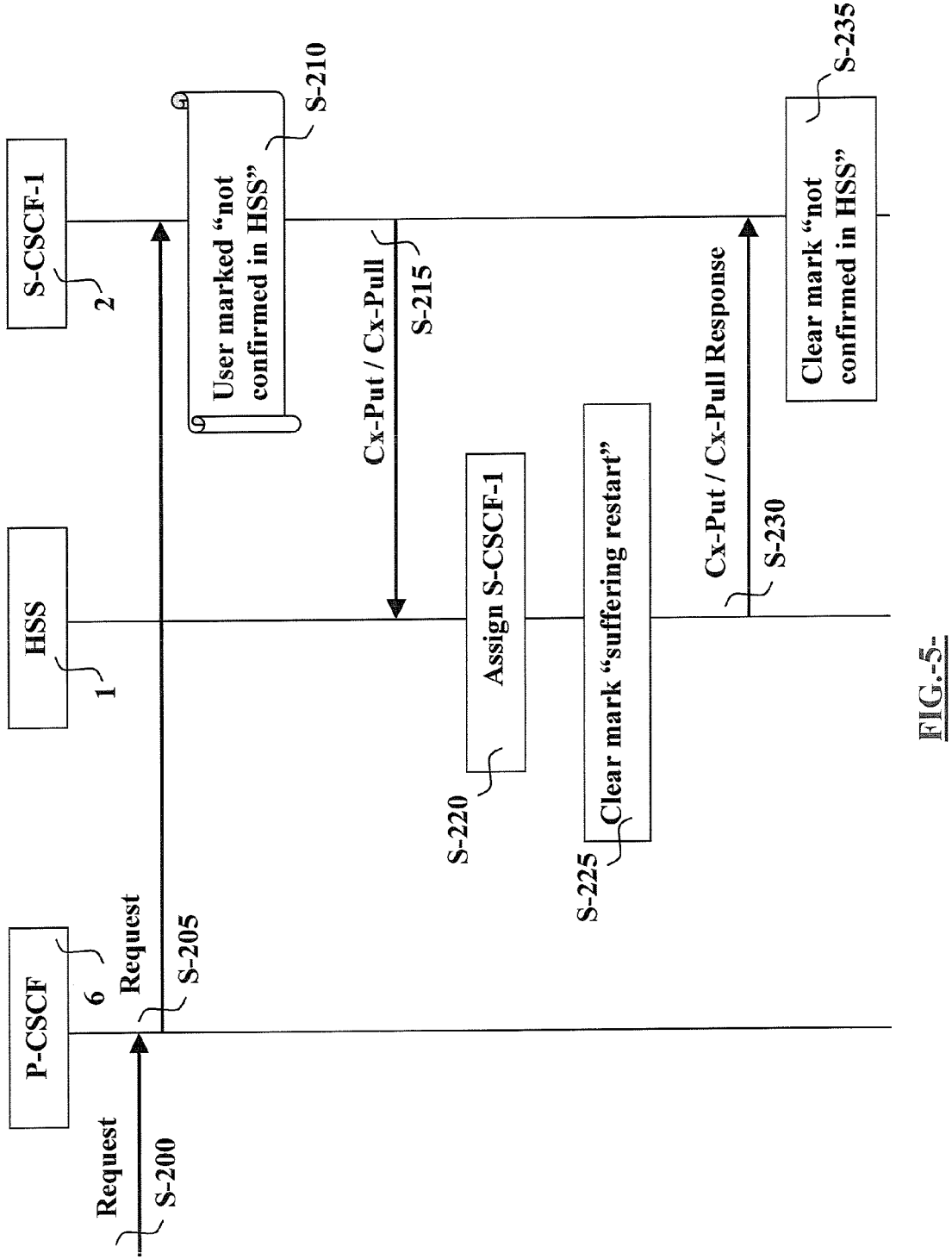
FIG. 5 is a sequence diagram illustrating a second method of recovery to be applied in an IMS after having detected a restart condition in a HSS holding subscriber data for subscribers of the IMS.

In accordance with a second aspect of the present invention, FIG. 3 and FIG. 5 illustrate an embodiment of the second method of recovery to be applied in the IMS after having detected a restart condition in a HSS 1 holding subscriber data for subscribers of the IMS, and as receiving a service request from a given subscriber at a S-CSCF 2 previously assigned for serving the given subscriber in the IMS.

This second method assumes that a first S-CSCF 2, hereinafter S-CSCF-1, had previously been assigned in steps S-001 or S-050, respectively shown in FIG. 1 in FIG. 2, for serving a given subscriber; and the method starts with a preliminary first step not shown in FIG. 3 or FIG. 5 for the sake of simplicity, namely with a first step of detecting a restart condition in the HSS 1, as illustrated by steps S-005 in FIG. 1 and S-055 in FIG. 2.

To this end, as illustrated in FIG. 7 and FIG. 9, the HSS 1 includes a memory module 13 for accessing subscriber data stored for each subscriber of the IMS and a processor 10 arranged for detecting a restart condition in the HSS. In particular, as already commented above and as illustrated in FIG. 7, the memory module 13 of the HSS 1 may include a memory handler 130 for accessing subscriber data stored in an external database 131 for each subscriber of the IMS. Alternatively and as illustrated in FIG. 9, the memory module 13 may include an internal database 132 for storing subscriber data for each subscriber of the IMS. Also to this end, as illustrated in FIG. 8, the S-CSCF 2 previously assigned for serving the given subscriber includes a memory module 22 for storing subscriber data received from the HSS 1 for subscribers currently served in the S-CSCF 2.

After having detected the restart condition in HSS, and as illustrated in FIG. 3, the HSS alerts during steps S-100, S-100bis, S-100ter, S-105, S-105bis, S-105ter in this second method towards relevant IMS entities 2, 3, 5 about the HSS restart. In particular, this step of alerting relevant IMS entities may be carried out with a reset message submitted from the HSS. Each IMS entity receiving such reset marks all subscribers belonging to said HSS as 'not confirmed in HSS' to indicate that the HSS might have lost some subscriber data during the restart or, at least, might not completely trust some dynamic data for its subscribers. To this end, the processor 10 of the HSS 1 is arranged for determining relevant IMS entities to be alerted about the restart condition in HSS, and the HSS 1 includes a sender 11 arranged for submitting a reset message, alerting about the restart condition detected in the HSS, towards those relevant IMS entities as determined in the HSS. Also to this end, as illustrated in FIG. 8, the S-CSCF 2 includes a receiver 21 arranged for receiving the reset message from the HSS alerting about the restart condition detected in the HSS, and a processor 20 arranged for marking in the memory module 22 all subscribers belonging to said HSS as 'not confirmed in HSS'.

This second method continues, as illustrated in FIG. 5, when a message related to a given subscriber, who was already registered in the IMS, is received at a S-CSCF-1 previously assigned for serving the given subscriber during a step S-205. The S-CSCF-1 determines during a step S-210 that the given subscriber is marked in the S-CSCF-1 as 'not confirmed in HSS' and initiates a registration of the given subscriber towards the HSS during a step S-215 in order to confirm that the S-CSCF-1 is presently serving the given subscriber. To this end, as illustrated in FIG. 8, the receiver 21 of the S-CSCF 2 is arranged for receiving the message related to the given subscriber previously served by the S-CSCF 2, the processor 20 of the S-CSCF 2 is arranged for determining whether the given subscriber is marked as 'not confirmed in HSS', and the S-CSCF-2 includes a sender 23 arranged for registering the given subscriber towards the HSS where the processor 20 determines that the given subscriber is marked as 'not confirmed in HSS'. In particular, where a Session Initiation Protocol (hereinafter SIP) is used for communication with the S-CSCF, the above message related to a given subscriber might be a SIP message, such as "Invite", "Update", "Subscribe", Bye, etc, other than the one used for registration, namely "Register", or might be a SIP response of a type such as 2xx, 3xx, 4xx, 5xx, etc.

The HSS receiving such registration, or confirmation, re-assigns the S-CSCF-1 as presently serving the given subscriber during a step S-220, and the S-CSCF-1 clears the mark 'not confirmed in HSS' for the given subscriber during a step S-235. To this end, as illustrated in FIG. 7 and FIG. 9, the receiver 12 of the HSS 1 is arranged for receiving a registration, or confirmation, from the S-CSCF 2 presently serving the given subscriber registered in the IMS, and the processor 10 of the HSS 1 is arranged for assigning the S-CSCF 2 in the memory module 13 as presently serving the given subscriber when the receiver receives the registration from the S-CSCF 2. Also to this end, as illustrated in FIG. 8, the processor 20 of the S-CSCF 2 is arranged for clearing such mark 'not confirmed in HSS' for a given subscriber.

In particular, said message related to the given subscriber may be submitted during a step S-200 towards the S-CSCF-1 from a P-CSCF 6 where the given subscriber accesses the IMS through, as illustrated in FIG. 5; or may be originated from an originating subscriber addressing the given subscriber, and submitted from another S-CSCF 3, namely S-CSCF-2, serving said originating subscriber, which is not shown in any drawing. To this end, as illustrated in FIG. 8, the receiver 21 of the S-CSCF 2 is arranged for receiving the message related to the given subscriber, previously served by the S-CSCF and marked as 'not confirmed in HSS', from a P-CSCF 6 where the given subscriber accesses the IMS through. Alternatively, the receiver 21 of the S-CSCF 2 is arranged for receiving the message related to the given subscriber, previously served by the S-CSCF and marked as 'not confirmed in HSS', from a second S-CSCF 3 serving an originating subscriber other than the given subscriber.

Where this second method is applied in combination with the above first method, the HSS may mark all registered subscribers as 'suffering Restart', during a step S-120 as illustrated in FIG. 3, and after having detected the restart condition in the HSS. In this case, such mark 'suffering Restart' may be cleared in the HSS for the given subscriber during a step S-225, as receiving a confirmation from the S-CSCF-1 in step S-215 and marking said S-CSCF-1 as presently serving the given subscriber in step S-220.

To this end, the processor 10 of the HSS, illustrated in FIGS. 7 and 9, may be arranged for marking in the memory module 13 all registered subscribers as 'suffering Restart', and for clearing such mark for a given subscriber when the receiver 21 receives the registration from the S-CSCF 2 presently serving the given subscriber.

Moreover, where this second method is applied in combination with the above first method, any step S-140 or S-240 in the first method of receiving at an I-CSCF a registration from a given subscriber or an invitation to communicate with a given subscriber, might occur sooner than the step S-205 in the second method of receiving a message related to a given subscriber at a S-CSCF previously assigned for serving the given subscriber registered in the IMS. In such a situation, this second method may further comprise a step of querying relevant entities of the IMS for finding the S-CSCF currently serving the given subscriber; a step of receiving a positive response from the S-CSCF currently serving the given subscriber; a step of assigning said S-CSCF in the HSS for serving the given subscriber; a step of clearing the mark 'suffering Restart' for the given subscriber in the HSS; and a step of selecting said S-CSCF in the I-CSCF for serving the given subscriber. In particular, the step of querying relevant entities of the IMS for finding the S-CSCF currently serving the given subscriber may be carried out from the HSS upon receiving a query from the I-CSCF about a selectable S-CSCF for serving the given subscriber, or from the I-CSCF upon receiving a response from the HSS indicating a restart condition and, likely, an indication of not trusting, or having lost, data related to a previously assigned S-CSCF.

To this end, as illustrate in FIG. 7 and FIG. 9, and in accordance with an embodiment of the invention, the receiver 12 of the HSS 1 may be arranged for receiving a query from an I-CSCF 4 asking for the S-CSCF 2 presently assigned for serving the given subscriber; the processor 10 of the HSS 1 may be arranged for determining a corresponding query from the HSS 1 towards relevant IMS entities 2, 3, 5; and the sender 11 of the HSS 1 may be arranged for broadcasting the query towards every relevant IMS entity known to the HSS. Moreover, the receiver 12 of the HSS 1 may be further arranged for receiving a positive response from the S-CSCF 2 presently assigned for serving the given subscriber; the processor 10 of the HSS 1 may be further arranged for assigning the S-CSCF 2 as presently serving said given subscriber; and the sender 11 of the HSS 1 may be further arranged for submitting a response towards the I-CSCF 4 indicating the S-CSCF 2 presently serving said given subscriber. Alternatively, and in accordance with another embodiment of the invention, the receiver 12 of the HSS 1 may be arranged for receiving a query from an I-CSCF 4 asking for the S-CSCF 2 presently assigned for serving the given subscriber; the processor 10 of the HSS 1 may be arranged for determining a further query from the I-CSCF 4 towards relevant IMS entities 2, 3, 5; and the sender 11 of the HSS 1 may be arranged for returning towards the I-CSCF 4 an indication of broadcasting the query towards every S-CSCF 2, 3 known to the I-CSCF 4.

Also to this end, as illustrated in FIG. 8, and in accordance with an embodiment of the invention, the receiver 21 of the S-CSCF 2 may be arranged for receiving a query from an I-CSCF 4 asking for the S-CSCF 2 presently assigned for serving a given subscriber; the processor 20 of the S-CSCF 2 may be arranged for determining that the given subscriber is marked 'not confirmed in HSS'; and the sender 23 of the S-CSCF 2 may be arranged for submitting a response indicating the S-CSCF 2 is presently assigned for serving the given subscriber. Moreover, the sender 23 of the S-CSCF 2 may be further arranged for submitting a confirmation towards the HSS 1 indicating that the S-CSCF 2 is presently assigned for serving the given subscriber, and the processor 20 of the S-CSCF 2 may be further arranged for clearing the mark 'not confirmed in HSS' for the given subscriber. Given that this query may be submitted towards the S-CSCF 2 from the I-CSCF 4 after said S-CSCF 2 has already confirmed towards the HSS 1 to be presently serving the given subscriber, such query may be received at a S-CSCF 2 after having cleared the mark 'not confirmed in HSS'; to this end, the receiver 21 of the S-CSCF 2 may be further arranged for receiving a query from an I-CSCF 4 asking for the S-CSCF 2 presently assigned for serving a given subscriber; the processor 20 of the S-CSCF 2 may be further arranged for determining that the given subscriber is not marked as 'not confirmed in HSS'; and the sender 23 may be further arranged for ignoring the query or for submitting a negative response.

Alternatively, and in accordance with another embodiment of the invention, the receiver 21 of the S-CSCF 2 may be arranged for receiving a query from the HSS 1 asking for the S-CSCF presently assigned for serving a given subscriber; the processor 20 of the S-CSCF 2 may be arranged for determining that the given subscriber is marked as 'not confirmed in HSS', and for clearing such mark for the given subscriber; and the sender 23 of the S-CSCF 2 may be arranged for submitting a response towards the HSS 1 indicating that the S-CSCF 2 is presently assigned for serving the given subscriber. As for previous embodiment, and given that this query may be submitted towards the S-CSCF 2 from the HSS 1 after said S-CSCF 2 has already confirmed towards the HSS 1 to be presently serving the given subscriber, such query may be received after having cleared the mark 'not confirmed in HSS' at a S-CSCF 2; to this end, the receiver 21 of the S-CSCF 2 may be further arranged for receiving a query from the HSS 1 asking for the S-CSCF 2 presently assigned for serving a given subscriber; the processor 20 of the S-CSCF 2 may be further arranged for determining that the given subscriber is not marked as 'not confirmed in HSS'; and the sender 23 of the S-CSCF 2 may be further arranged for ignoring the query or for submitting a negative response.

The invention also provides for a computer program, loadable into an internal memory of a computer with input and output units as well as with a processing unit, the computer program comprising executable software adapted to carry out method steps as described above for both first and second methods, alone or in combination, when running in the computer, and wherein the executable software may be recorded in a carrier readable in a computer.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A method of recovery to be applied in an IP Multimedia Subsystem "IMS" after having detected a restart condition of a Home Subscriber Server "HSS" holding subscriber data for subscribers of the IMS, and after having received a registration from a given subscriber or an invitation to communicate with a given subscriber from another subscriber, the method comprising the steps of:
    detecting a restart condition in a HSS holding subscriber data for subscribers of the IMS;
    marking in the HSS all registered subscribers as 'suffering Restart';
    receiving at an Interrogating Call Session Control Function server "I-CSCF" a registration from a given subscriber or an invitation to communicate with a given subscriber;
    the I-CSCF querying the HSS about a selectable Serving Call Session Control Function server "S-CSCF" for serving the given subscriber;
    determining that the given subscriber is marked in the HSS as 'suffering Restart';
    querying relevant entities of the IMS to find the S-CSCF currently serving the given subscriber;
    receiving a positive response from the S-CSCF currently serving the given subscriber;
    assigning said S-CSCF in the HSS for serving the given subscriber;
    clearing the mark 'suffering Restart' for the given subscriber in the HSS; and
    selecting said S-CSCF in the I-CSCF for serving the given subscriber.

2. The method of claim 1, wherein the step of querying relevant entities of the IMS includes the HSS querying a S-CSCF still marked as assigned for serving the given subscriber after detecting the restart condition.

3. The method of claim 1, wherein the step of querying relevant entities of the IMS includes the HSS querying every S-CSCF known to the HSS.

4. The method of claim 1, wherein the step of querying relevant entities of the IMS includes the I-CSCF querying a S-CSCF still marked as assigned for serving the given subscriber in the HSS, and includes a step of responding to the query about a selectable S-CSCF with a response indicating that the given subscriber is marked as 'suffering Restart' in the HSS and identifying said S-CSCF.

5. The method of claim 1, wherein the step of querying relevant entities of the IMS includes the I-CSCF querying every S-CSCF known to the I-CSCF, and includes a step of responding to the query about a selectable S-CSCF with a response indicating that the given subscriber is marked as 'suffering Restart' in the HSS.

6. The method of claim 1, wherein the step of receiving the positive response from the S-CSCF currently serving the given subscriber includes a step of the S-CSCF registering the given subscriber at the HSS.

7. The method of claim 1, further comprising a step of the HSS alerting relevant entities of the IMS known to the HSS about the restart condition; and a step of marking all subscribers belonging to said HSS in each relevant entity receiving the alert as 'not confirmed in HSS'.

8. The method of claim 7, wherein the step of receiving a positive response from the S-CSCF currently serving the given subscriber includes a step of clearing the mark marking "not confirmed in HSS" in said S-CSCF for the given subscriber.

9. A Home Subscriber Server "HSS" holding subscriber data for subscribers of an IP Multimedia Subsystem "IMS", the HSS having:
    a memory module for accessing subscriber data stored for each subscriber of the IMS;
    a processor arranged for detecting a restart condition in the HSS, for marking in the memory module all registered subscribers as 'suffering Restart', for clearing such mark for a given subscriber, for determining whether a given subscriber is marked in the HSS as 'suffering Restart', and for assigning a Serving Call Session Control Function server "S-CSCF" for serving a given subscriber in the memory module upon confirmation from said S-CSCF;
    a receiver arranged for receiving a query about a selectable S-CSCF for serving a given subscriber, and for receiving a confirmation from a S-CSCF currently serving a given subscriber; and
    a sender arranged for submitting, as a response to the query, an identifier of the S-CSCF currently serving the given subscriber, or capabilities required for selecting a S-CSCF for serving the given subscriber, or an indication that the given subscriber is marked as 'suffering Restart', or combinations thereof.

10. The HSS of claim 9, wherein the sender is further arranged for querying relevant entities of the IMS for finding the S-CSCF currently serving the given subscriber.

11. The HSS of claim 10, wherein the query sent to relevant entities is only submitted towards a S-CSCF still marked as assigned for serving the given subscriber after detecting the restart condition.

12. The HSS of claim 10, wherein the query sent to relevant entities is submitted towards every S-CSCF known to the HSS.

13. The HSS of claim 9, wherein the sender is further arranged for submitting, as a response to the query about a selectable S-CSCF for serving a given subscriber, an identifier of a S-CSCF still marked as assigned for serving the given subscriber after detecting the restart condition.

14. The HSS of claim 9, wherein the sender, in cooperation with the processor, is further arranged for submitting a reset message to alert about the restart condition detected in the HSS towards relevant entities of the IMS known to the HSS.

15. The HSS of claim 9, wherein the processor is arranged for clearing the mark 'suffering Restart' for a given subscriber when the receiver receives a confirmation from the S-CSCF currently serving the given subscriber.

16. The HSS of claim 9, wherein the memory module includes a memory handler for accessing subscriber data for each subscriber of the IMS, the subscriber data stored in an external database.

17. The HSS of claim 9, wherein the memory module includes an internal database storing subscriber data for each subscriber of the IMS.

18. A Serving Call Session Control Function server "S-CSCF" assignable for serving a subscriber registered in an IP Multimedia Subsystem "IMS", the S-CSCF having:
    a memory module for storing subscriber data for subscribers currently served in the S-CSCF, the subscriber data received from a Home Subscriber Server "HSS" holding subscriber data for subscribers of the IMS;

a receiver arranged for receiving a query of whether the S-CSCF is currently serving a given subscriber;

a processor arranged for determining whether a given subscriber is currently served by the S-CSCF; and a sender arranged for answering the query with a positive response if the processor determines that the given subscriber is currently served by the S-CSCF.

19. The S-CSCF of claim 18, wherein the receiver is arranged for receiving the query of whether the S-CSCF is currently serving a given subscriber from the HSS to which the given subscriber belongs.

20. The S-CSCF of claim 18, wherein the receiver is arranged for receiving the query about the S-CSCF currently serving a given subscriber from an Interrogating Call Session Control Function server "I-CSCF" responsible for routing a registration from the given subscriber or an invitation to communicate with the given subscriber.

21. The S-CSCF of claim 20, wherein the sender is further arranged for submitting a confirmation towards the HSS indicating that the S-CSCF is currently serving the given subscriber.

22. The S-CSCF of claim 18, wherein the receiver is further arranged for receiving a reset message from a HSS alerting about a restart condition detected in the HSS; and wherein the processor is further arranged for marking in the memory module all subscribers belonging to said HSS as 'not confirmed in HSS', and for determining whether a given subscriber is marked as 'not confirmed in HSS'.

23. The S-CSCF of claim 22, wherein the processor is arranged for clearing the mark 'not confirmed in HSS' for the given subscriber when the sender answers the query with a positive response.

24. A method of recovery to be applied in an IP Multimedia Subsystem "IMS" upon receiving a service request from a given subscriber at a Serving Call Session Control Function server "S-CSCF" previously assigned for serving the given subscriber in the IMS, the request being received after detecting a restart condition of a Home Subscriber Server "HSS" holding subscriber data for subscribers of the IMS, the method comprising the steps of:

detecting a restart condition in a HSS holding subscriber data for subscribers of the IMS;

sending an alert from the HSS towards relevant IMS entities about the HSS restart;

marking all subscribers belonging to said HSS in each relevant IMS entity receiving the alert as 'not confirmed in HSS';

receiving a message related to a given subscriber at a S-CSCF previously assigned for serving the given subscriber;

determining that the given subscriber is marked in the S-CSCF as 'not confirmed in HSS';

sending a registration from the S-CSCF for the given subscriber towards the HSS;

re-assigning said S-CSCF, from which the given subscriber is registered, at the HSS as presently serving said given subscriber; and clearing the mark "not confirmed in HSS" in said S-CSCF for the given subscriber.

25. The method of claim 24, wherein the step of receiving a message related to a given subscriber includes a step of originating the message from an originating subscriber addressing the given subscriber; and a step of submitting the service request by another S-CSCF serving the originating subscriber.

26. The method of claim 24, wherein the step of receiving a message related to a given subscriber includes a step of submitting the request from a Proxy Call Session Control function server "P-CSCF" through which the given subscriber accesses the IMS.

27. The method of claim 24, further comprising a step of marking in the HSS all registered subscribers as 'suffering Restart', following the step of detecting the restart condition in a HSS holding subscriber data for subscribers of the IMS.

28. The method of claim 27, wherein the step of sending a registration from the S-CSCF for the given subscriber towards the HSS includes a step of clearing the marking 'suffering Restart' in the HSS for the given subscriber.

29. A Home Subscriber Server "HSS" holding subscriber data for subscribers of an IP Multimedia Subsystem "IMS", the HSS having:

a memory module for accessing subscriber data stored for each subscriber of the IMS;

a receiver arranged for receiving a registration from a Serving Call Session Control Function server "S-CSCF" presently serving a given subscriber registered in the IMS;

a processor arranged for detecting a restart condition in the HSS, for determining relevant IMS entities to be alerted about the restart condition in HSS, and for storing in the memory module an identifier of the S-CSCF as presently serving the given subscriber when the receiver receives the registration from the S-CSCF; and a sender arranged for sending a reset message alerting about the restart condition detected in the HSS towards relevant IMS entities known to the HSS.

30. The HSS of claim 29, wherein the processor, when detecting the restart condition in the HSS, is further arranged for marking all registered subscribers in the memory module as 'suffering Restart'.

31. The HSS of claim 30, wherein the processor is arranged for clearing the mark 'suffering Restart' for a given subscriber when the receiver receives the registration from the S-CSCF presently serving the given subscriber.

32. The HSS of claim 29, wherein the receiver is further arranged for receiving a query from an Interrogating Call Session Control Function server "I-CSCF" querying about the S-CSCF presently assigned to serve the given subscriber; the processor is further arranged for determining a corresponding query to be sent from the HSS towards relevant IMS entities; and the sender is further arranged for broadcasting the corresponding query to every relevant IMS entity known to the HSS.

33. The HSS of claim 32, wherein the receiver is further arranged for receiving a positive response from the S-CSCF presently assigned for serving the given subscriber; the processor is further arranged for assigning the S-CSCF to be presently serving said given subscriber; and the sender is further arranged for submitting a response to the I-CSCF indicating the S-CSCF presently serving said given subscriber.

34. The HSS of claim 29, wherein the receiver is further arranged for receiving a query from an Interrogating Call Session Control Function server "I-CSCF" asking for the S-CSCF presently assigned for serving the given subscriber; the processor is further arranged for determining a further query from the I-CSCF towards relevant IMS entities; and the sender is further arranged for returning an indication of broadcasting the query towards every S-CSCF known to the I-CSCF.

35. The HSS of claim 29, wherein the memory module includes a memory handler for accessing subscriber data for each subscriber of the IMS, the subscriber data stored in an external database.

36. The HSS (1) of claim 29, wherein the memory module includes an internal database for storing subscriber data for each subscriber of the IMS.

37. A Serving Call Session Control Function server "S-CSCF" assignable for serving a subscriber registered in an IP Multimedia Subsystem "IMS", the S-CSCF having:
- a memory module for storing subscriber data for subscribers currently served in the S-CSCF, the subscriber data received from a Home Subscriber Server "HSS" holding subscriber data for subscribers of the IMS;
- a receiver arranged for receiving a reset message from a HSS alerting about a restart condition detected in the HSS, and for receiving a message related to a given subscriber previously served by the S-CSCF;
- a processor arranged for marking in the memory module all subscribers belonging to said HSS as 'not confirmed in HSS', for clearing such mark for a given subscriber, and for determining whether a given subscriber is marked as 'not confirmed in HSS'; and
- a sender arranged for registering the given subscriber towards the HSS where the processor determines that the given subscriber is marked as 'not confirmed in HSS'.

38. The S-CSCF of claim 37, wherein the receiver is further arranged for receiving a query from an Interrogating Call Session Control function server "I-CSCF" querying about the S-CSCF presently assigned to serve a given subscriber; the processor is further arranged for determining that the given subscriber is marked 'not confirmed in HSS'; and the sender is further arranged for submitting a response indicating the S-CSCF is presently assigned for serving the given subscriber.

39. The S-CSCF of claim 38, wherein the sender is further arranged for sending a confirmation to the HSS indicating that the S-CSCF is presently assigned for serving the given subscriber, and the processors is further arranged for clearing the mark 'not confirmed in HSS' for the given subscriber.

40. The S-CSCF of claim 37, wherein the receiver is further arranged for receiving a query from an Interrogating Call Session Control function server "I-CSCF" querying about the S-CSCF presently assigned to serve a given subscriber; the processor is further arranged for determining that the given subscriber is not marked as 'not confirmed in HSS'; and the sender is further arranged for ignoring the query or for submitting a negative response.

41. The S-CSCF of claim 37, wherein the receiver is further arranged for receiving a query from the HSS querying about the S-CSCF presently assigned to serve a given subscriber; the processor is further arranged for determining that the given subscriber is marked as 'not confirmed in HSS', and for clearing such mark for the given subscriber; and the sender is further arranged for submitting a response towards the HSS indicating that the S-CSCF is presently assigned for serving the given subscriber.

42. The S-CSCF of claim 37, wherein the receiver is further arranged for receiving a query from the HSS querying about the S-CSCF presently assigned to serve a given subscriber; the processor is further arranged for determining that the given subscriber is not marked as 'not confirmed in HSS'; and the sender is further arranged for ignoring the query or for submitting a negative response.

43. The S-CSCF of claim 37, wherein the receiver is arranged for receiving the message, which is related to the given subscriber, previously served by the S-CSCF and marked as 'not confirmed in HSS', from a second S-CSCF serving an originating subscriber other than the given subscriber.

44. The S-CSCF of claim 37, wherein the receiver is arranged for receiving the message, which is related to the given subscriber, previously served by the S-CSCF and marked as 'not confirmed in HSS', from a Proxy Call Session Control Function server "P-CSCF" through which the given subscriber accesses the IMS.

45. A computer program, stored on a non-transitory storage medium, which when executed by a computer causes the computer to carry out the method steps according to claim 1.

* * * * *